(12) United States Patent
Sanchez

(10) Patent No.: US 11,598,622 B2
(45) Date of Patent: Mar. 7, 2023

(54) MEASURING TAPE GUIDE

(71) Applicant: Macario Alberto Sanchez, Rochester, MN (US)

(72) Inventor: Macario Alberto Sanchez, Rochester, MN (US)

(73) Assignee: Macario A. Sanchez, Rochester, MN (US)

( * ) Notice: Subject to any disclaimer, the term of this patent is extended or adjusted under 35 U.S.C. 154(b) by 76 days.

(21) Appl. No.: 17/155,919

(22) Filed: Jan. 22, 2021

(65) Prior Publication Data

US 2022/0236043 A1   Jul. 28, 2022

(51) Int. Cl.
*G01B 3/10*        (2020.01)
*G01B 3/1056*      (2020.01)
*G01B 3/1089*      (2020.01)
*G01B 3/1007*      (2020.01)
G01B 3/1005       (2020.01)

(52) U.S. Cl.
CPC ......... *G01B 3/1056* (2013.01); *G01B 3/1007* (2020.01); *G01B 3/1089* (2020.01); *G01B 2003/1035* (2013.01)

(58) Field of Classification Search
CPC .................................................... G01B 3/1056
USPC ................................... 33/757, 759, 760, 770
See application file for complete search history.

(56) References Cited

U.S. PATENT DOCUMENTS

| | | | | |
|---|---|---|---|---|
| 4,103,426 A * | 8/1978 | Robin | ................. | G01B 3/1071 33/767 |
| 5,542,184 A * | 8/1996 | Beard | ................. | G01B 3/1084 7/163 |
| 6,694,622 B2 * | 2/2004 | Kim | ................. | B26B 29/00 33/760 |
| 7,266,905 B1 * | 9/2007 | Lee | ................. | G01B 3/1056 33/768 |
| 7,845,093 B2 * | 12/2010 | Smiroldo | ............. | G01B 3/1061 33/668 |
| 8,819,954 B1 * | 9/2014 | Fernandez | ........... | G01B 3/1084 33/768 |
| 9,267,778 B2 * | 2/2016 | Burch | ................. | G01B 3/1061 |
| 9,410,785 B1 * | 8/2016 | Deutscher | ............ | G01B 3/1056 |
| 9,557,151 B1 * | 1/2017 | Sanchez | ............... | G01B 3/1084 |
| 9,982,984 B2 * | 5/2018 | Feeney | ................ | G01B 3/1056 |
| 10,928,175 B2 * | 2/2021 | Hwang | ................ | G01B 3/1069 |
| 11,333,478 B1 * | 5/2022 | Porter | ................. | G01B 3/1089 |
| 2008/0141549 A1 * | 6/2008 | Brown | ................ | G01B 3/1056 33/755 |
| 2015/0308806 A1 * | 10/2015 | DeSilva | ............... | G01B 3/1056 7/163 |

\* cited by examiner

*Primary Examiner* — George B Bennett

(57) ABSTRACT

The present invention provides a measuring tape having one or more guiding elements, provides the ability for quick and easy cutting and/or scribing of lines on drywall and other materials. A guiding element comprising a rigid attachment having an elongated aperture is provided that can receive a writing utensil tip or cutting blade. In addition, the main body of the tape measure may contain a second guiding element that can be placed against the outer edge of whichever construction material is being marked or cut, thereby providing an appropriate surface to facilitate the travel of the tape measure body along the edge of the material. This guide also acts as protection of the fingers/hand that holds the main body of the tape measure during travel.

4 Claims, 8 Drawing Sheets

MEASURING TAPE GUIDE

FIELD OF INVENTION

The present invention relates generally to the field of hand tools and accessories. More specifically, the present invention relates to a measuring tape having attached a guiding element comprising an elongated aperture for inserting a marking or cutting tool, enabling quick and easy cutting and/or scribing of lines on drywall and other materials.

BACKGROUND

Measuring tapes are common in construction and are often used to measure drywall and other construction material sections before cutting. A typical method is to measure the length between two points on the material, mark the points, and draw a line connecting the points with a straight edge before cutting.

However more experienced workers often shortcut this method by holding the measuring tape body against an outer edge of the material to be marked/cut, extending the tip of the tape across the surface of the material to a desired length, holding a writing utensil or knife blade against the tape tip with one hand, and gliding both hands in the direction of the desired cut or mark such that the body of the tape slides along the outer edge while the writing or cutting utensils glides along the surface of the material at a uniform distance from the outer edge, thereby scribing and/or cutting the material in one motion.

Such methods are difficult to perform, often resulting in poor quality cuts and marks, and put the hands of the user at serious risk from both the blade and outer edge of the construction material, yet users still carry out these methods to save time. It is within this context that the present invention is provided.

SUMMARY

The present invention provides a measuring tape having one or more guiding elements, provides the ability for quick and easy cutting and/or scribing of lines on drywall and other materials. A guiding element comprising a rigid attachment having an elongated aperture is provided that can receive a writing utensil tip or cutting blade. In addition, the main body of the tape measure may contain a second guiding element that can be placed against the outer edge of whichever construction material is being marked or cut, thereby providing an appropriate surface to facilitate the travel of the tape measure body along the edge of the material. This guide also acts as protection of the fingers/hand that holds the main body of the tape measure during travel.

Thus, according to an aspect of the present invention there is provided a measuring tape, comprising: a tape housing having an opening; a retractable roll of tape enclosed within the tape housing and having a tip protruding from the opening of the tape housing, wherein the tape is configured to extend from the opening of the tape housing in a straight line along a first direction across a first plane with respect to the housing; and a locking mechanism configured, upon actuation, to move between a first position where movement of the roll of tape relative to the housing is locked and a second position where the roll of tape is freely extendable and retractable; characterized in that the tip of the roll of tape comprises a rigid attachment having a first surface parallel to the first plane and an elongated aperture in the first surface, the elongated aperture being elongated in a direction perpendicular to the first plane.

The rigid attachment may further comprise a guide wall surrounding the aperture and extending in a plane perpendicular to the first plane.

In a preferred embodiment, the housing further comprises a second rigid attachment fixed adjacent to the opening and the tip of the tape, the second rigid attachment extending away from the housing along the first plane then extending away from the opening along a plane perpendicular to the first plane. The second rigid attachment may be fixed to the tape housing via a rotatable or retractable fitting, and be further configured to be withdrawn to a position where the second rigid attachment is flush with the outer surface of the housing.

BRIEF DESCRIPTION OF THE DRAWINGS

Various embodiments of the invention are disclosed in the following detailed description and accompanying drawings.

Figure 1:
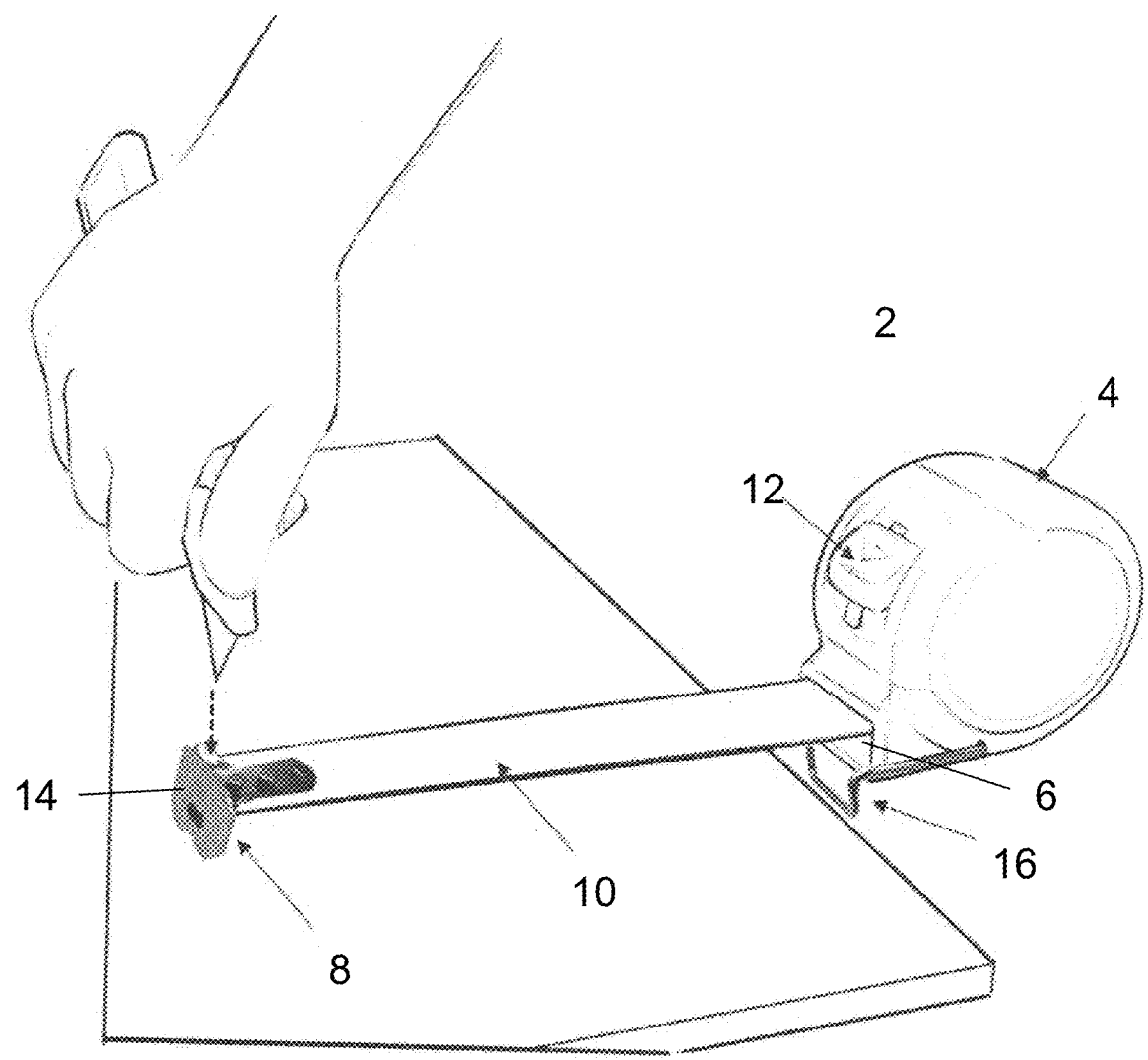
FIG. 1 illustrates an example configuration of a tape measure device according to the present invention in use during the marking of a construction material.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

In describing the invention, it will be understood that a number of techniques and steps may be disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Referring to FIG. 1, an example configuration of a tape measure device 2 according to the present invention is shown in use during the marking of a construction material.

As shown, the measuring tape device comprises a tape housing 4 having an opening 6 for allowing a retractable roll of tape enclosed within the tape housing 4 to be extended from. When not in use, the tip 8 of the retractable roll of tape rests at the opening entrance 6, and during use can be extended outwards to assist a user with measuring a distance between two points. The tape 10 is connected to a mechanism within the housing 4 which applies pressure to retract the tape 10 when not being held extended by a user. The device further comprises a locking mechanism 12 in the form of an actuatable switch on the outer surface of the housing which is connected to the mechanism controlling the extension and retraction of the roll of tape, the locking mechanism being configured, upon actuation, to move between a first position where movement of the roll of tape relative to the housing is locked and a second position where the roll of tape is freely extendable and retractable.

These features of measuring tape devices are known to those skilled in the art and will not be elaborated upon in more detail herein. The main housing 4 of the device can be made of plastic, metal or any other similar material suited for this purpose.

The device is characterized by having a rigid attachment 14 at the tip of the roll of tape having an elongated aperture formed into a guiding wall that allows a user to insert a scribing or cutting implement through the aperture to allow easy marking or cutting of a construction material upon which the guiding element is placed.

In some examples the device is further characterized by having a second rigid attachment 16 attached to the housing 4 of the device, preferably at a point near the opening 6, which is shaped to allow the housing of the tape to be glided along an outer edge of a construction material against which the body of the device is resting. This enables the main housing 4 to be held against the edge of a material and permits smooth longitudinal motion along that material's edge.

These aspects of the present invention are illustrated in more detail with reference to FIGS. 2 to 6.

Figure 2:
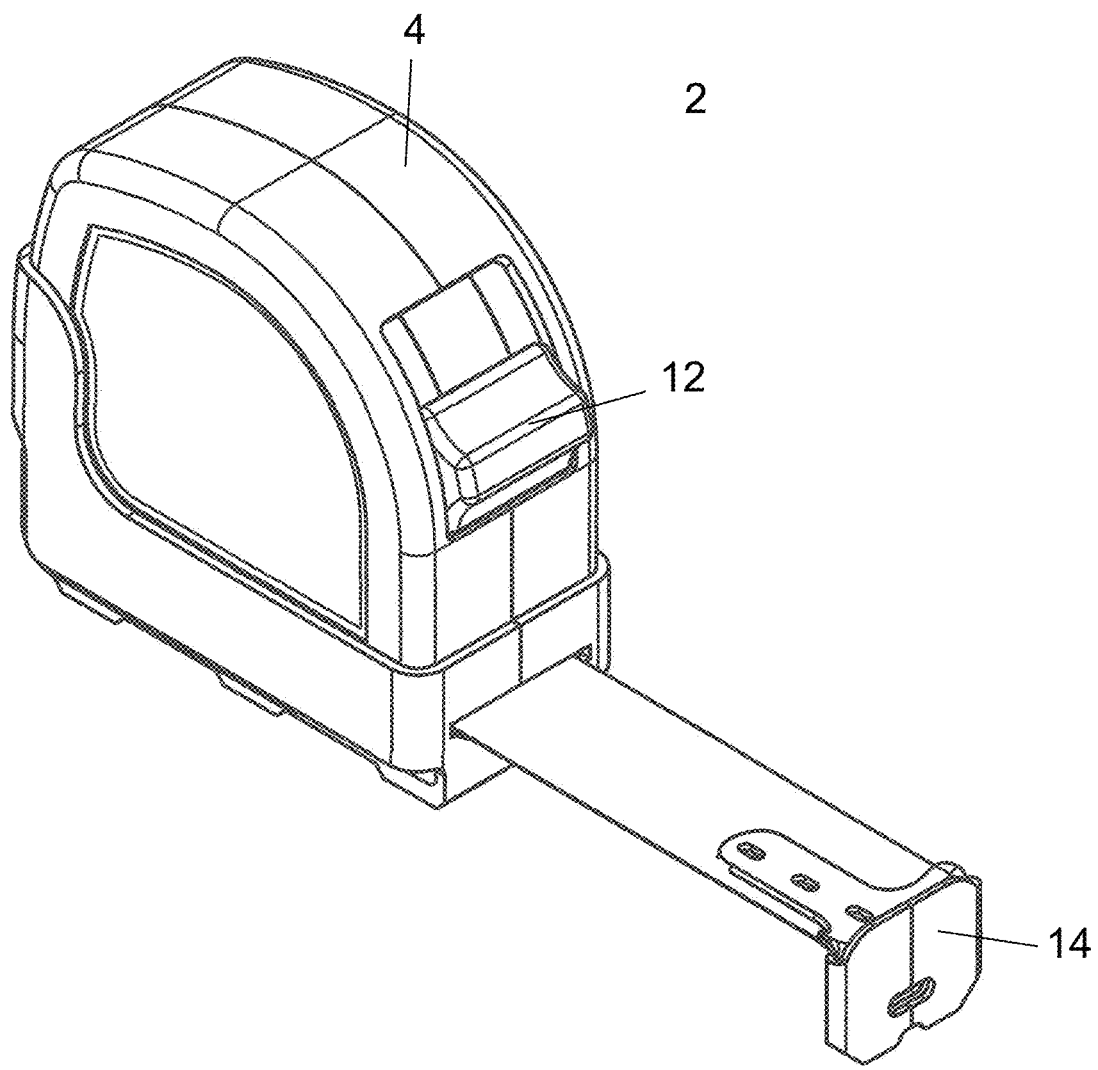
FIG. 2 illustrates a first perspective view of an example configuration of the tape measure device according to the present invention close up.

Referring to FIG. 2, a first perspective view of an example configuration of the tape measure device according to the present invention is shown close up. The second rigid attachment is not illustrated in the present example.

As can be seen, the rigid attachment 14 forms a guiding wall that the blade or tip of a scribing or cutting implement can be slotted into, the guiding wall being configured to guide such an implement in a direction perpendicular to the plane of the flat tape. Advantageously, implements are prevented from slipping during marking and cutting operations, increasing safety and accuracy.

Figure 3:
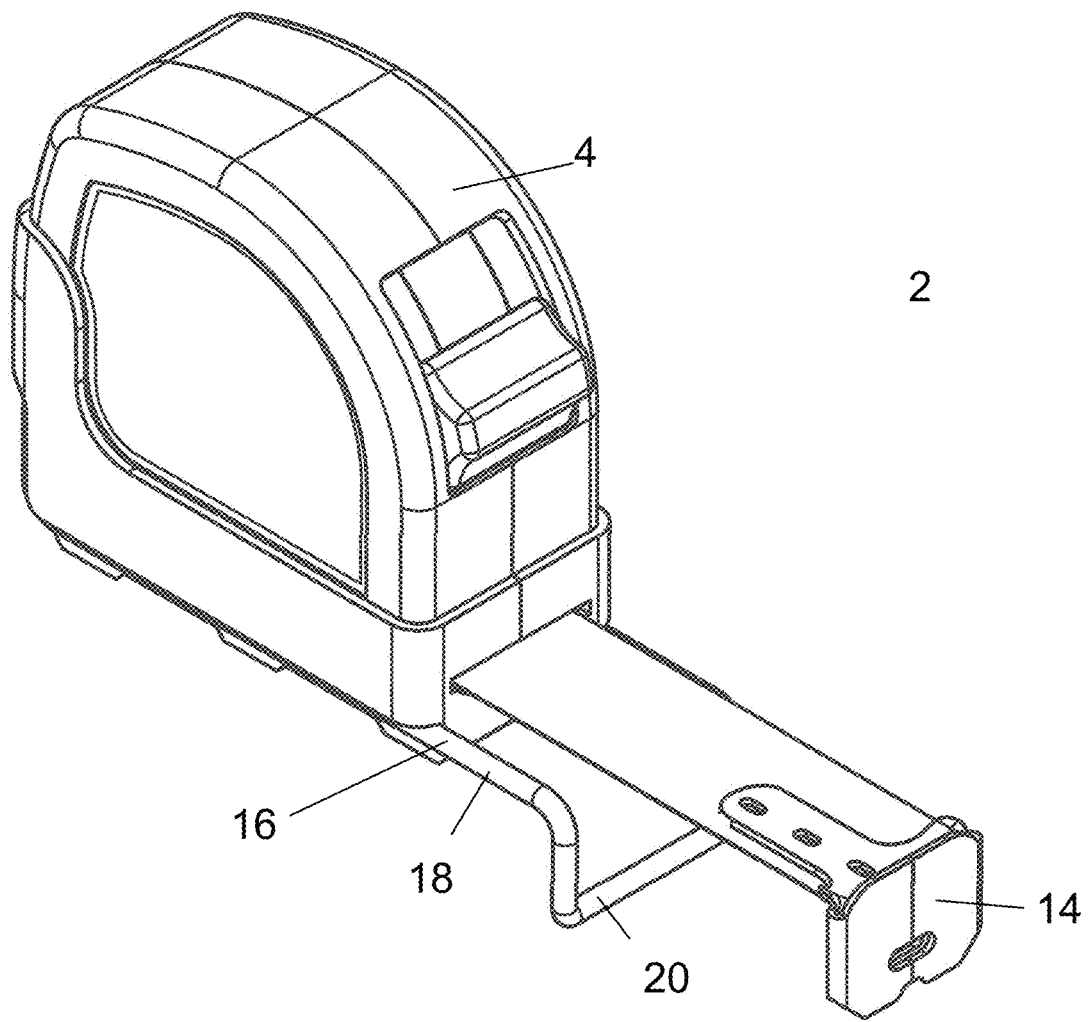
FIG. 3 illustrates a second perspective view of the example configuration of the tape measure device according to the present invention close up, with the second guiding element in an extended position.

Referring to FIG. 3, a second perspective view of the example configuration of the tape measure device according to the present invention is shown close up, with the second guiding element 16 visible in an extended position.

The second rigid guiding element 16 can be in the form of a lightweight metal frame which is attached to the housing 4 of the tape measure device 2. As shown, when extended, the second guiding element 16 comprises a first length 18 extending away from the housing 4 in a direction parallel to the direction in which the tape extends, but further comprises a lip or ridge 20 extending perpendicularly away from the tape. This shape advantageously bears all of the friction when the body of the tape measure device is slid along the outer edge of a construction material being marked or cut, reducing the risk of a user damaging their fingers against such an outer edge.

Figure 4:
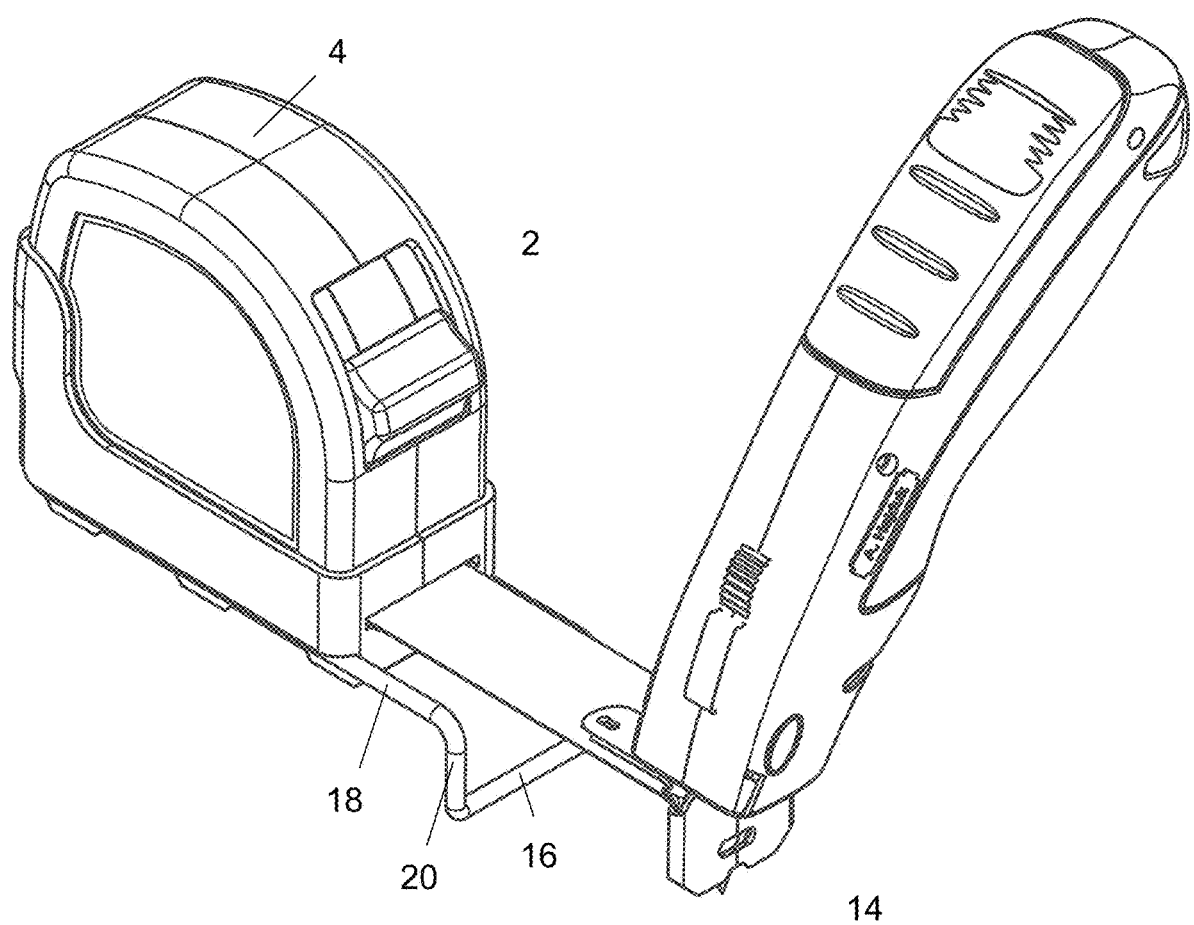
FIG. 4 illustrates the second perspective view of the example configuration of the tape measure device according to the present invention close up, with the second guiding element in an extended position and a marking device held in place by the first guiding element.

Referring to FIG. 4, the same perspective view of the example configuration of the tape measure device according to the present invention is shown, with the second guiding element in an extended position and a marking device held in place by the first guiding element.

It can be seen that the implement blade fits snuggly into the aperture formed by the guiding walls of rigid element 14.

Figure 5:
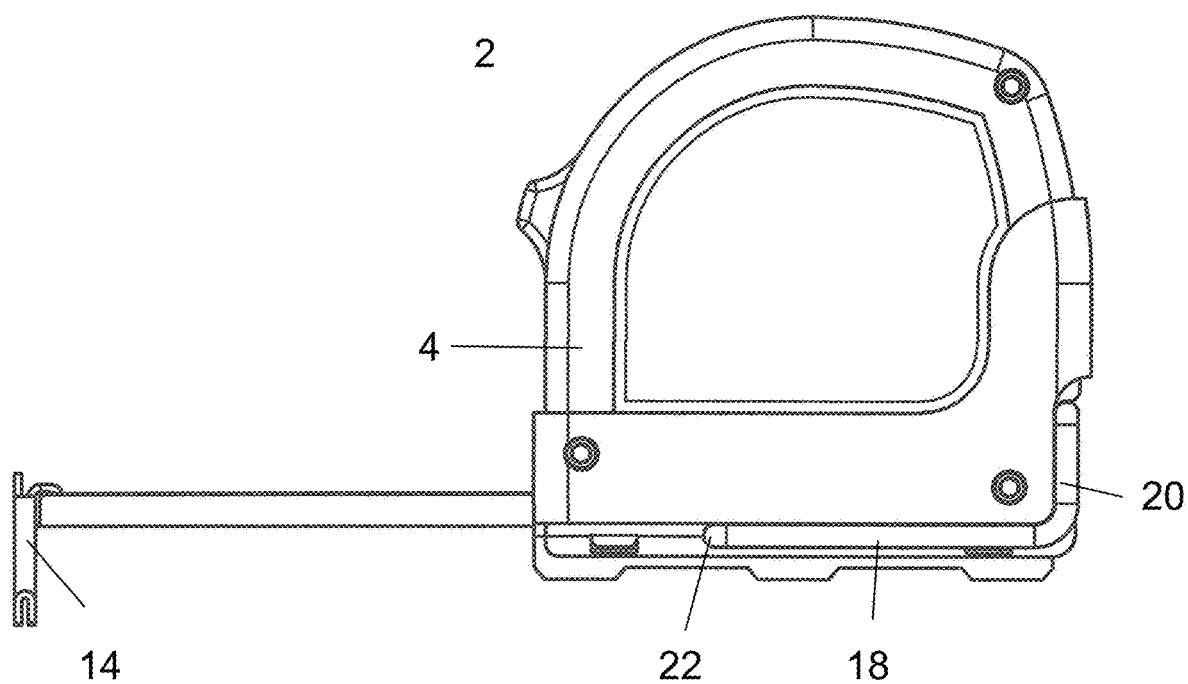
FIG. 5 illustrates a third perspective view of the example configuration of the tape measure device according to the present invention close up, with the second guiding element in a retracted position.

Referring to FIG. 5, a third perspective view of the example configuration of the tape measure device according to the present invention is shown to better illustrate an example way of implementing the second guiding element 16.

As shown, the second guiding element 16 can be attached to the outer surface of the housing 4 by a rotatable joint 22, and shaped with the first length 18 and second length 22 having dimensions such that the guiding element can be rotated/retracted and be flush with the outer surface of the opposing side of the housing 4.

Figure 6:
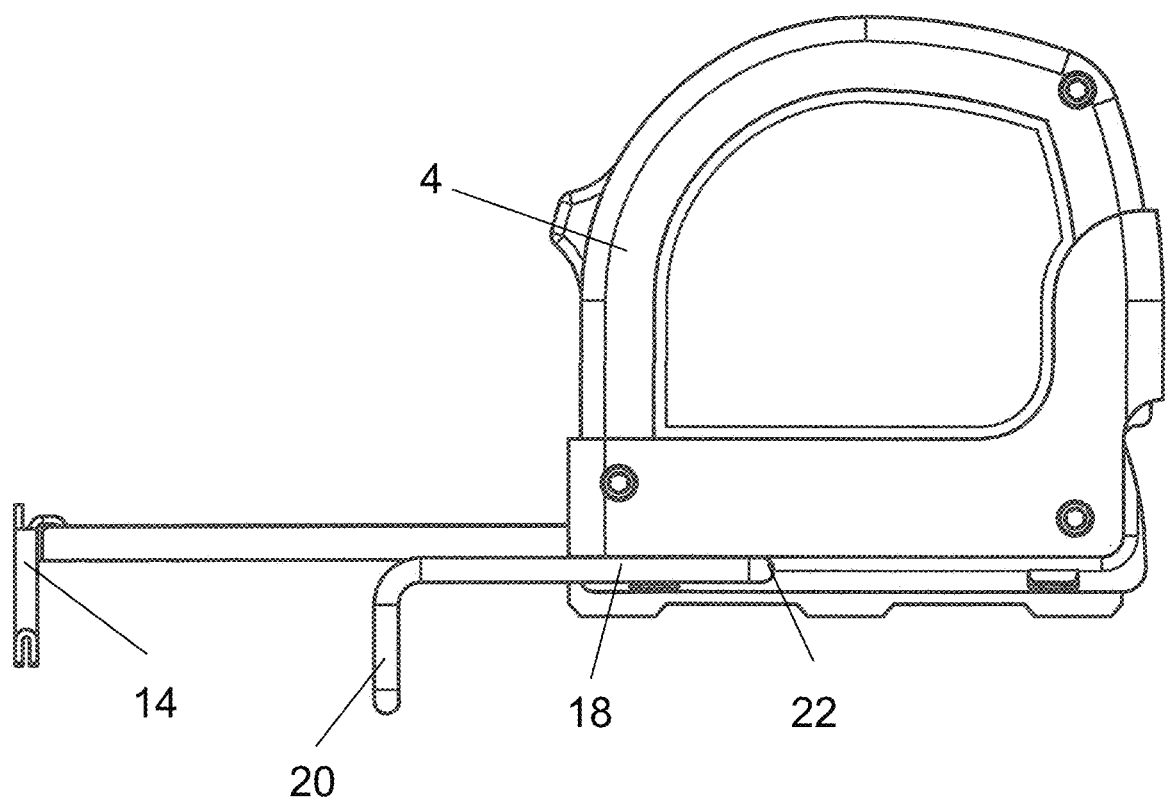
FIG. 6 illustrates the third perspective view of the example configuration of the tape measure device according to the present invention close up, with the second guiding element in an extended position.

Referring to FIG. 6, the same perspective view of the example configuration of the tape measure device according to the present invention is shown, with the second guiding element 16 rotated round to be in an extended position.

An example operation using the device of the present invention will now be described.

The tape measure secondary guiding element 16 is extended and is moved into position and placed against the edge of a material such as drywall. The leading end or tip of the tape is pulled, extending the measuring tape to the desired measurement. Once at that length, the locking lever on the main housing is engaged, fixing the tape length to that desired length. A cutting blade or scribing instrument is then inserted into the leading end guiding element 14 and pressed against the material to be cut/scribed. In a single smooth longitudinal motion, the main housing, measuring tape, and leading end guide are all moved along the surface of the material, thus cutting/scribing the material at the desired length.

During the above motion, secondary guide 16 is held against the edge of the material allowing smooth longitudinal motion along that material's edge as well as reducing the danger to fingers during this motion.

Figure 7:
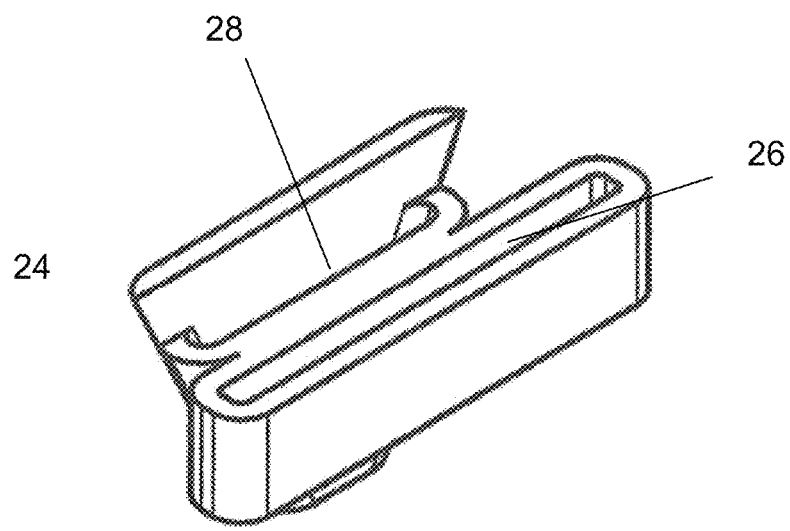
FIG. 7 illustrates an example configuration of an attachment guiding piece for the tip of the tape measure device according to the present invention.

Referring to FIG. 7, an example configuration of an attachment guiding piece 24 is shown, the attachment guiding piece 24 being configured to attach to a tape measure device tip that does not have a guide set into it already to provide a guide for a cutting or marking implement. The piece 24 comprises a first aperture 26 which is configured to receive the extension of a standard tape measure device tip, and a second aperture 28 which is parallel to the first aperture 24 and which is configured to receive a cutting or marking implement, thereby ensuring the cutting or marking implement marks/cuts in line with the tip of the tape measure device.

Figure 8:
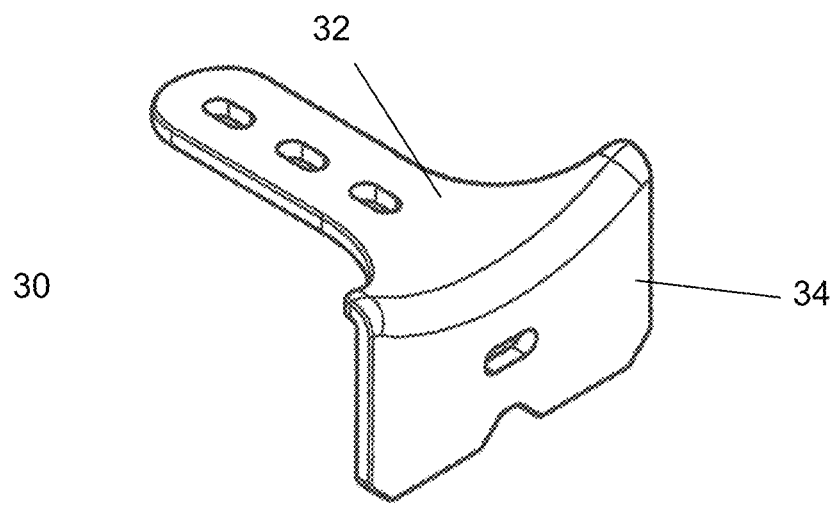
FIG. 8 illustrates an example configuration of the tip of the tape measure device of the present invention.

Referring to FIG. 8, an example configuration of an alternative tip 30 for the tape measure device of the present invention is shown which is similar to standard tape measure devices and requires an attachment such as that illustrated in FIG. 7 in order to achieve the effects of the present disclosure. The alternative tip 30 has a first portion 32 configured to be attached to the actual tape part of the tape measure device and a second portion 34 extending perpendicularly from the first portion, and which can be received by the first aperture 26 of the attachment guiding piece.

Figure 9:
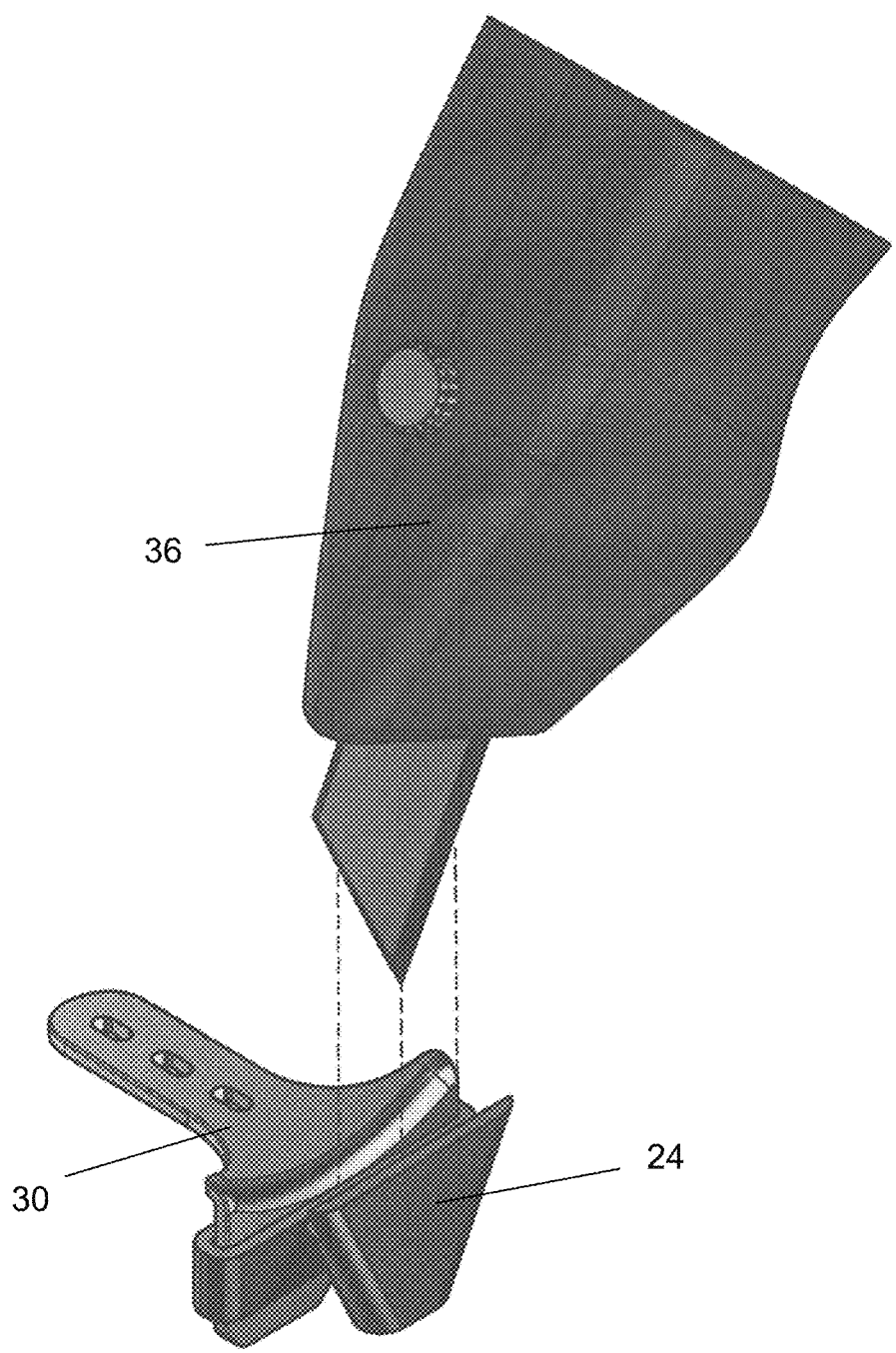
FIG. 9 illustrates an example configuration of the tip of the tape measure device of the present invention with the attachment guiding piece of FIG. 7 equipped and a cutting tool ready to be inserted into the attachment.

Referring to FIG. 9, an example configuration of the alternative tip 30 of the tape measure device of the present invention is shown with the attachment guiding piece 24 equipped and a cutting tool 36 ready to be inserted into the attachment.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the tape measure have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A measuring tape, comprising:
    a tape housing having an opening;
    a retractable roll of tape enclosed within the tape housing and having a tip protruding from the opening of the tape housing, wherein the tape is configured to extend from the opening of the tape housing in a straight line along a first direction across a first plane with respect to the housing; and
    a locking mechanism configured, upon actuation, to move between a first position where movement of the roll of tape relative to the housing is locked and a second position where the roll of tape is freely extendable and retractable;
    characterised in that the tip of the roll of tape comprises a rigid attachment having a first surface parallel to the first plane and an elongated aperture in the first surface, the elongated aperture being elongated in a direction perpendicular to the first plane.

2. A measuring tape according to claim 1, wherein the rigid attachment further comprises a guide wall surrounding the aperture and extending in a plane perpendicular to the first plane.

3. A measuring tape according to claim 1 or claim 2, wherein the housing further comprises a second rigid attachment fixed adjacent to the opening and the tip of the tape, the second rigid attachment extending away from the housing along the first plane then extending away from the opening along a plane perpendicular to the first plane.

4. A measuring tape according to claim 3, wherein the second rigid attachment is fixed to the tape housing via a rotatable or retractable fitting, and is configured to be withdrawn to a position where the second rigid attachment is flush with the outer surface of the housing.

\* \* \* \* \*